(12) United States Patent
Matsushita et al.

(10) Patent No.: US 10,766,099 B2
(45) Date of Patent: Sep. 8, 2020

(54) FRICTION STIR WELDING APPARATUS FOR STRUCTURAL STEEL

(71) Applicant: JFE STEEL CORPORATION, Tokyo (JP)

(72) Inventors: Muneo Matsushita, Chiba (JP); Koichi Taniguchi, Chiba (JP); Rinsei Ikeda, Chiba (JP)

(73) Assignee: JFE STEEL CORPORATION, Tokyo (JP)

( * ) Notice: Subject to any disclaimer, the term of this patent is extended or adjusted under 35 U.S.C. 154(b) by 252 days.

(21) Appl. No.: 15/556,792

(22) PCT Filed: Mar. 17, 2016

(86) PCT No.: PCT/JP2016/001542
§ 371 (c)(1),
(2) Date: Sep. 8, 2017

(87) PCT Pub. No.: WO2016/147668
PCT Pub. Date: Sep. 22, 2016

(65) Prior Publication Data
US 2018/0043466 A1    Feb. 15, 2018

(30) Foreign Application Priority Data
Mar. 19, 2015    (JP) .................... 2015-055729

(51) Int. Cl.
*B23K 20/12*    (2006.01)

(52) U.S. Cl.
CPC .......... *B23K 20/1235* (2013.01); *B23K 20/12* (2013.01); *B23K 20/1225* (2013.01); *B23K 20/1245* (2013.01)

(58) Field of Classification Search
None
See application file for complete search history.

(56) References Cited

U.S. PATENT DOCUMENTS

| | | | |
|---|---|---|---|
| 6,776,328 B2 * | 8/2004 | Rice | B23K 20/1235 228/112.1 |
| 6,793,118 B2 * | 9/2004 | Palm | B23K 20/1235 228/112.1 |

(Continued)

FOREIGN PATENT DOCUMENTS

| | | |
|---|---|---|
| CN | 1251549 A | 4/2000 |
| CN | 102672346 A | 9/2012 |

(Continued)

OTHER PUBLICATIONS

NPL—Nandan et al. "Three-dimensional heat and material flow during friction stir welding of mild steel", Acta Materialia, issue 55, p. 883-895, 2007 (Year: 2007).*

(Continued)

*Primary Examiner* — Devang R Patel
(74) *Attorney, Agent, or Firm* — Oliff PLC

(57) ABSTRACT

A friction stir welding apparatus that includes a rotary tool and a heating device. The heating device is placed in front of the rotary tool to heat steel sheets that are used as a workpiece. The rotary tool is moved in the welding direction so that steel sheet is softened by frictional heat. Additionally, the surface temperature, the area, and the position of the heated region during the heating process are strictly controlled. The heating of the steel sheets by the welding apparatus provides sufficient strength and good welding workability by advantageously eliminating plastic flow defects generated due to insufficient heating of workpieces.

20 Claims, 4 Drawing Sheets

(56) References Cited

U.S. PATENT DOCUMENTS

| | | | |
|---|---|---|---|
| 9,216,473 B2* | 12/2015 | Kiridena | B21J 15/42 |
| 2004/0155093 A1* | 8/2004 | Nelson | B23K 20/122 |
| | | | 228/112.1 |
| 2006/0065698 A1* | 3/2006 | Ishikawa | B23K 20/1235 |
| | | | 228/112.1 |
| 2008/0099533 A1* | 5/2008 | Hanlon | B23K 20/122 |
| | | | 228/112.1 |
| 2012/0298304 A1* | 11/2012 | Kato | B23K 20/1235 |
| | | | 156/350 |
| 2014/0027496 A1* | 1/2014 | Castillo | B23K 20/12 |
| | | | 228/102 |

FOREIGN PATENT DOCUMENTS

| | | |
|---|---|---|
| CN | 104203481 A | 12/2014 |
| EP | 1514632 A1 | 3/2005 |
| EP | 2 835 209 A1 | 2/2015 |
| EP | 3053696 A1 | 8/2016 |
| JP | S62-183979 A | 8/1987 |
| JP | H07-505090 A | 6/1995 |
| JP | 2001-205460 A | 7/2001 |
| JP | 2003-094175 A | 4/2003 |
| JP | 2003-532542 A | 11/2003 |
| JP | 2003-532543 A | 11/2003 |
| JP | 2004154790 A | 6/2004 |
| JP | 2004174575 A * | 6/2004 |
| JP | 2005-288474 A | 10/2005 |
| WO | 98/45080 A1 | 10/1998 |
| WO | 2015/045299 A1 | 4/2015 |
| WO | 2015/045421 A1 | 4/2015 |

OTHER PUBLICATIONS

Dec. 3, 2018 Notice of Allowance issued in Korean Application No. 10-2017-7024293.

Feb. 19, 2019 Office Action issued in Chinese Application No. 201680015809.9.

May 24, 2016 International Search Report issued in International Patent Application No. PCT/JP2016/001542.

Mar. 13, 2018 Extended Search Report issued in European Patent Application No. 16764499.6.

* cited by examiner

FRICTION STIR WELDING APPARATUS FOR STRUCTURAL STEEL

TECHNICAL FIELD

The present disclosure relates to an apparatus for a friction stir welding method for welding workpieces without the addition of a filler metal by causing a rotary tool to penetrate into a non-welded part between the workpieces and moving the rotary tool while the rotary tool rotates. This friction stir welding method utilizes softening of the workpieces by frictional heat generated between the workpieces and the rotary tool and plastic flow produced by stirring the softened portion with the rotary tool. More particularly, the present disclosure relates to an apparatus that achieves sufficient strength and good welding workability by advantageously eliminating plastic flow defects due to insufficient heating of the workpieces and that have been a concern when the workpieces are made of structural steel.

As used herein, for example, the term "non-welded part" refers to an abutting portion between steel sheets that merely abut each other and are not welded yet. The term "welded part" refers to a portion welded and integrated by plastic flow.

BACKGROUND ART

As a friction welding method, PTL 1 discloses a technique for welding metal materials that involves rotating at least one of a pair of metal materials to generate frictional heat and soften the metal materials and stirring the softened portion to produce plastic flow.

Since this technique involves rotating metal materials to be welded, there are limitations on the shape and the dimensions of metal materials to be welded.

PTL 2 discloses a method (friction stir welding method) for continuously welding workpieces in the longitudinal direction using heat generated between the workpieces and a tool and plastic flow by causing the tool to penetrate into a non-welded part of the workpieces and moving the tool while the tool is rotated. The tool is made of a material substantially harder than the workpieces.

The friction welding method disclosed in PTL 1 involves welding workpieces with frictional heat between the workpieces while the workpieces are rotated. The friction stir welding method disclosed in PTL 2 involves welding the workpieces by moving the tool with the tool being rotated while the workpieces are fixed. Therefore, this method has an advantage of continuous solid-state welding of workpieces in the longitudinal direction, the workpieces being substantially infinitely long in the welding direction. Since this method is associated with solid-state welding using plastic flow of metal produced by frictional heat between the rotary tool and the workpieces, the workpieces can be welded together without the need to melt the welded part. Furthermore, this method has many advantages of, for example, less deformation after welding because of low heating temperature, fewer defects because of the fact that the welded part is not melted, and no necessity for a filler metal.

The friction stir welding method has a wide range of applications in the fields pertaining to aircraft, watercraft, railed vehicles, and motor vehicles, and other fields as a method for welding low-melting-point metal materials typified by aluminum alloys and magnesium alloys. The reason for this is that an arc welding process known in the art is unlikely to provide the welded part of such low-melting-point metal materials with satisfactory properties, and the use of the friction stir welding method improves productivity and the quality of the welded part.

The use of the friction stir welding method for structural steel mainly serving as a material for structures such as buildings, watercraft, heavy machines, pipelines, and motor vehicles avoids solidification cracking and hydrogen cracking, which are problematic in fusion welding known in the art, and also reduces microstructural changes in steel materials, which improves joint performance. The friction stir welding method also has an anticipated advantage of no necessity for a preparation step, such as diffusion welding, because stirring the joint interface with the rotary tool creates clean surfaces and enables contact between the clean surfaces. Consequently, the use of the friction stir welding method for structural steel has many anticipated advantages. However, challenges associated with welding workability, such as suppression of defect generation during welding and an increase in welding speed remain. These challenges hinder the friction stir welding method from being used for structural steel compared with low-melting-point metal materials.

In friction stir welding for structural steel, high abrasion resistance materials such as polycrystal boron nitride (PCBN) and silicon nitride ($SiN_4$) are currently used for rotary tools as described in PTL 3 and PTL 4. However, since these ceramics are brittle, there are strict limitations on the thickness of steel sheets to be welded and the conditions for processing the steel sheets in order to eliminate or reduce damage to the rotary tool.

PTL 5 and PTL 6 disclose welding methods using an additional heating function in addition to frictional heat generated between the rotary tool and the workpieces in order to improve welding workability.

For example, PTL 5 discloses a heating apparatus for a friction stir welding method. The heating apparatus has a heating function realized by an induction heating device, which heats workpieces before and after welding to increase the welding speed and prevent or reduce cracking in the welded part.

PTL 6 discloses a friction stir welding apparatus having a heating function realized by a laser device, which partially heats workpieces just before welding to reduce changes in microstructure around the region heated by preheating and increase the welding speed.

The techniques disclosed in PTLs 5 and 6, however, do not provide sufficient welding workability because no attention is given to, for example, the surface temperature and the depth of the heated region of the workpieces during heating before welding. In addition, excessive heating changes the microstructure around the heated region, which may adversely affect the weld joint properties, particularly the weld joint strength. Therefore, a practical friction stir welding method that achieves sufficient strength and good welding workability and a device that realizes such a practical friction stir welding method have not yet been developed.

CITATION LIST

Patent Literature

PTL 1: Japanese Unexamined Patent Application Publication No. 62-183979
PTL 2: Japanese Unexamined Patent Application Publication (Translation of PCT Application) No. 7-505090
PTL 3: Japanese Unexamined Patent Application Publication (Translation of PCT Application) No. 2003-532542

PTL 4: Japanese Unexamined Patent Application Publication (Translation of PCT Application) No. 2003-532543

PTL 5: Japanese Unexamined Patent Application Publication No. 2003-94175

PTL 6: Japanese Unexamined Patent Application Publication No. 2005-288474

SUMMARY

Technical Problem

The present disclosure has been developed in light of the above-mentioned circumstances. An object of the present disclosure is to provide a friction stir welding apparatus that achieves sufficient strength and good welding workability by advantageously eliminating plastic flow defects generated due to insufficient heating of workpieces during friction stir welding of structural steel. The present disclosure therefore provides a friction stir welding apparatus capable of performing the preheating process under particularly strictly specified conditions.

Solution to Problem

The inventors of the present disclosure have obtained the following findings as a result of diligent studies to solve the above-mentioned problems.

a) In ordinary friction stir welding, a heat source needed for welding is only frictional heat generated between a rotary tool and workpieces. In the case of friction stir welding of structural steel, heat quantity sufficient to soften structural steel being workpiece material cannot be ensured. As a result, sufficient plastic flow is not obtained in the welded part, which may result in deterioration of welding workability, such as low welding speed and generation of welding defects.

To avoid deterioration of welding workability, which is very important for industrialization of the technique described above, a friction stir welding apparatus capable of performing the preheating process before friction stir welding is considered effective.

b) However, excessive heat quantity during the preheating process before friction stir welding causes a problem associated with changes in microstructure around the heated region. In particular, in the case of high-tensile steel sheets reinforced by the martensite structure, heating at the ferrite-austenite transformation temperature or lower still tempers martensite to cause softening around the heated region and thus significantly reduces the weld joint strength.

The inventors have carried out various studies on the conditions of the preheating process before friction stir welding.

As a result, (c) the use of a heat source with high energy density, such as a laser, strictly controls the surface temperature, the area, and the position of the heated region in the preheating process and also properly controls the temperature of the heated region in the thickness direction as necessary. The inventors have found that this can improve welding workability without causing deterioration of weld joint properties such as weld joint strength.

d) Ordinary friction stir welding has a problem in that microstructure control by heat history management as in the rolling process during the production of steel material cannot be used because the welded part is naturally cooled after completion of welding. The inventors, however, have found that the weld joint properties can be further improved by subjecting the welded part to a combined heating and cooling process just after completion of welding.

The present disclosure is based on the above-mentioned findings.

Exemplary embodiments and features are described below. In a first embodiment, a friction stir welding apparatus for structural steel includes:

a rotary tool that includes a shoulder and a pin disposed on the shoulder, the pin sharing a rotation axis with the shoulder, at least the shoulder and the pin being made of a material harder than steel sheets used as workpieces, the rotary tool being configured to penetrate into a non-welded part of the steel sheets and to move in a welding direction while the rotary tool rotates, so that the steel sheets are softened by frictional heat between the rotary tool and the steel sheets and that the softened portion is stirred with the rotary tool to produce plastic flow; and a heating device that is provided in front of the rotary tool moving in the welding direction and that heats the steel sheet, wherein, where a region of the steel sheet whose surface temperature $T_s$ (° C.) is increased to $T_s \geq 0.8 \times T_{A1}$ ($T_{A1}$ is described in Formula (1) below) by the heating is defined as a heated region, a minimum distance between the rotary tool and the heated region on the surface of the steel sheet is equal to or less than a diameter of the shoulder of the rotary tool, an area of the heated region on the surface of the steel sheet is equal to or less than an area of a maximum diameter part of the pin of the rotary tool, and on the surface of the steel sheet, 50% or more of the area of the heated region is located between a welding centerline and a straight line that is parallel to the welding centerline and lies on an advancing side and at a distance equal to a maximum radius of the pin of the rotary tool from the welding centerline, the welding centerline being a straight line that passes through the rotation axis of the rotary tool and is parallel to the welding direction, $$T_{A1}(° C.)=723-10.7[\% \text{ Mn}]-16.9[\% \text{ Ni}]+29.1[\% \text{ Si}]+16.9[\% \text{ Cr}]+290[\% \text{ As}]+6.38[\% \text{ W}] \quad (1)$$

where [% M] represents an amount (mass %) of element M in the steel sheet used as a workpiece.

In a second embodiment, in the friction stir welding apparatus for structural steel according to the first embodiment, where a maximum depth of a region that extends from the surface of the steel sheet in the heated region in a thickness direction and has a temperature $T_D$ (° C.) satisfying $T_D \geq 0.8 \times T_{A1}$ ($T_{A1}$ is described in Formula (1) below) is defined as a depth D of the heated region, the depth D of the heated region is equal to or larger than 30% of a total thickness t of the steel sheet, $$T_{A1}(° C.)=723-10.7[\% \text{ Mn}]-16.9[\% \text{ Ni}]+29.1[\% \text{ Si}]+16.9[\% \text{ Cr}]+290[\% \text{ As}]+6.38[\% \text{ W}] \quad (1)$$

where [% M] represents an amount (mass %) of element M in the steel sheet used as a workpiece.

In a third embodiment, in the friction stir welding apparatus for structural steel according to the first or second embodiment, the heating device is a laser heating device.

In a fourth embodiment, the friction stir welding apparatus for structural steel according to any one of the first to third embodiments includes a rear heating device that is provided behind the rotary tool moving in the welding direction and that heats a welded part of the steel sheets.

In a fifth embodiment, the friction stir welding apparatus for structural steel according to the fourth embodiment includes a cooling device that is provided behind the rotary tool and after the rear heating device and that cools the welded part of the steel sheets.

In a sixth embodiment, the friction stir welding apparatus for structural steel according to any one of the first to third embodiments includes a cooling device that is provided behind the rotary tool moving in the welding direction and that cools a welded part of the steel sheets.

In a seventh embodiment, the friction stir welding apparatus for structural steel according to the sixth embodiment includes a rear heating device that is provided behind the rotary tool moving in the welding direction and after the cooling device and that reheats the welded part of the steel sheets.

Advantageous Effects

The use of a friction stir welding apparatus according to the present disclosure improves welding workability by advantageously eliminating plastic flow defects due to insufficient heating of workpieces, the plastic flow defects having been a concern for years, during friction stir welding of structural steel. The use of the friction stir welding apparatus also reduces changes in microstructure to provide high joint strength in the welded part.

DESCRIPTION OF EMBODIMENTS

Exemplary embodiments of the present disclosure are described in detail below.

Figure 1:
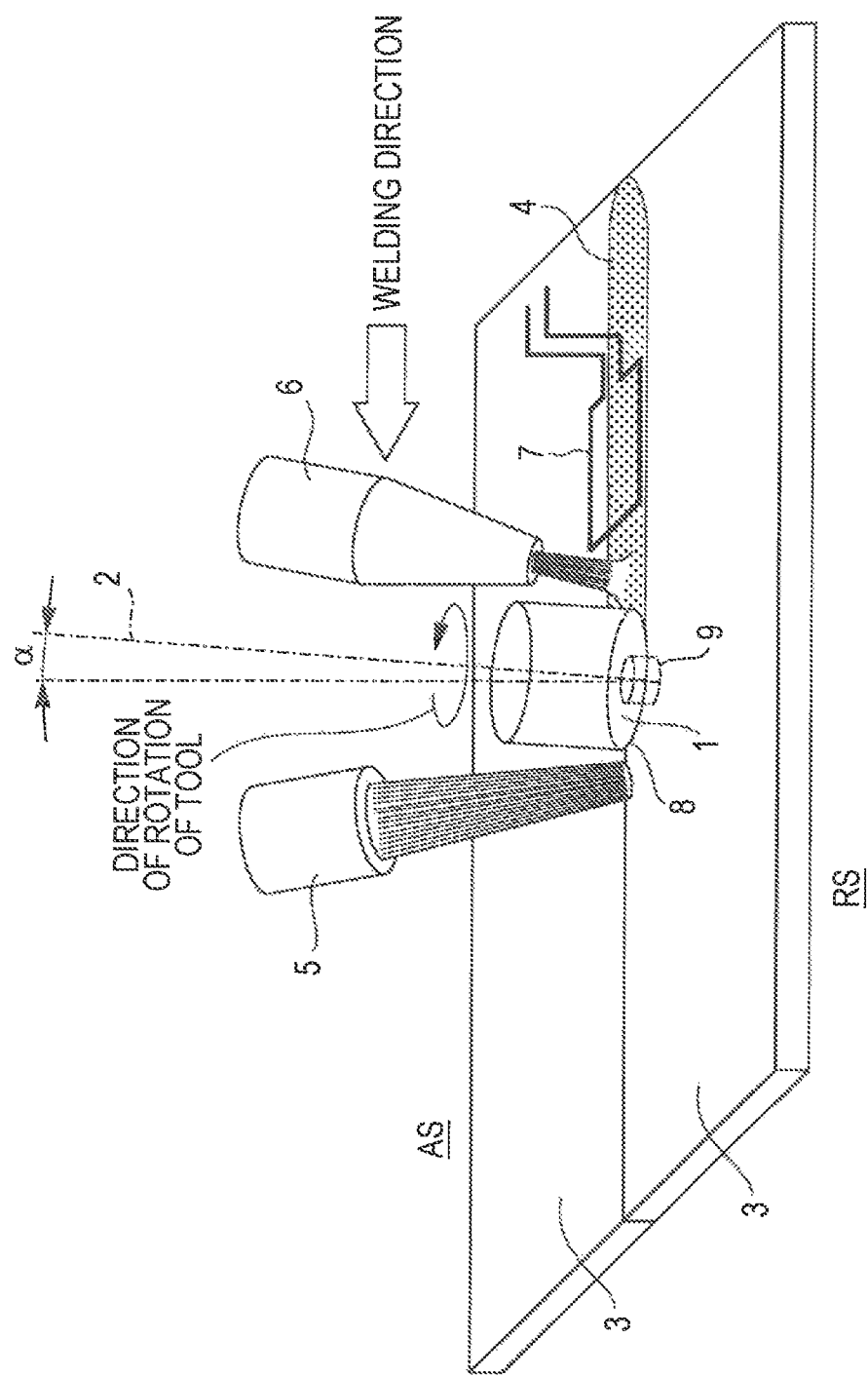
FIG. 1 is a schematic view illustrating a friction stir welding method of the present disclosure.

The present disclosure is directed to a friction stir welding apparatus for structural steel. As illustrated in FIG. 1, a rotary tool is caused to penetrate into a non-welded part of steel sheets and is moved in a welding direction while the rotary tool is rotated. The steel sheets are softened by frictional heat between the rotary tool and the steel sheets, and the softened portion is stirred with the rotary tool to produce plastic flow, whereby the steel sheets are welded together. The rotary tool includes a shoulder and a pin. The pin is disposed on the shoulder and shares the rotation axis with the shoulder. At least the shoulder and the pin are made of a material harder than the steel sheets used as workpieces.

In FIG. 1, the reference character 1 indicates a rotary tool, 2 a rotation axis, 3 a steel sheet, 4 a welded part, 5 a heating device, 6 a cooling device, 7 a rear heating device, 8 a shoulder of the rotary tool, 9 a pin of the rotary tool, and α an inclined angle of the rotary tool. The characters "AS" and "RS" indicate an advancing side and a retreating side, respectively.

The advancing side denotes the side on which the direction of rotation of the tool is the same as the welding direction. The retreating side denotes the side on which the direction of rotation of the tool is opposite to the welding direction.

In friction stir welding with the friction stir welding apparatus of the present disclosure, the preheating process for heating the steel sheet with the heating device in front of the rotary tool moving in the welding direction is important. The conditions of the preheating process will be described below with reference to FIG. 2.

Figure 2:
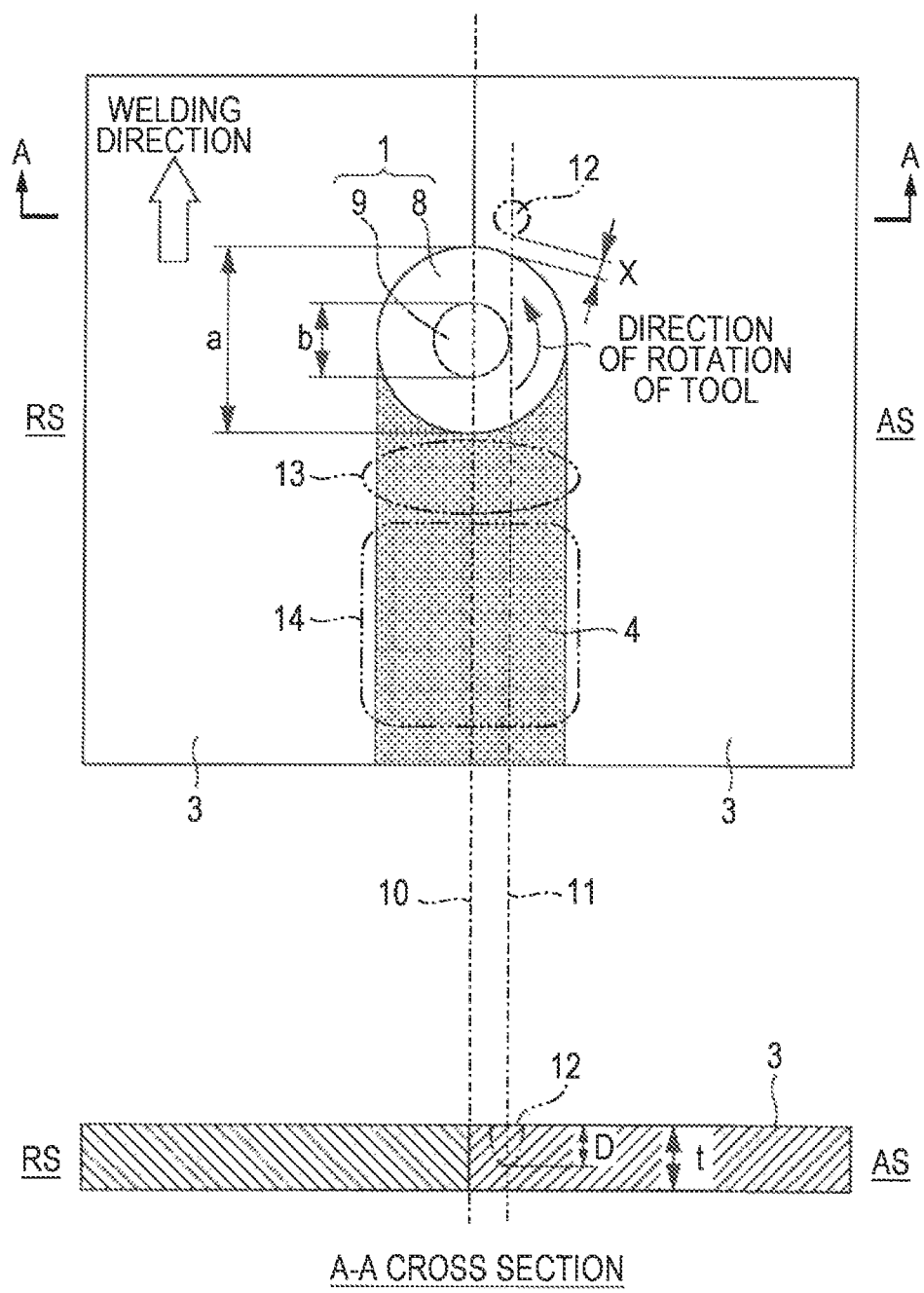
FIG. 2 illustrates views (top view and A-A cross-sectional view) of an example heated region in the preheating process, and an example cooled region and an example reheated region in the process performed after welding.

In FIG. 2, the reference character 10 indicates a welding centerline. The welding centerline is a straight line passing through the rotation axis of the rotary tool and being parallel to the welding direction on the surfaces of the steel sheets. The reference character 11 indicates a straight line (hereinafter referred to as an AS line) that is parallel to the welding centerline and lies on the advancing side and at a distance equal to the maximum radius of the pin of the rotary tool from the welding centerline. The reference character 12 indicates a heated region, 13 a cooled region, 14 a reheated region, a the diameter of the shoulder of the rotary tool, b the maximum diameter of the pin of the rotary tool, X the minimum distance between the heated region and the rotary tool, D the maximum depth of the heated region (hereinafter referred to as the depth D of the heated region), and t the thickness of the steel sheet.

[Surface Temperature $T_s$ of Steel Sheet in Heated Region: $T_s \geq 0.8 \times T_{A1}$]

Figure 3:
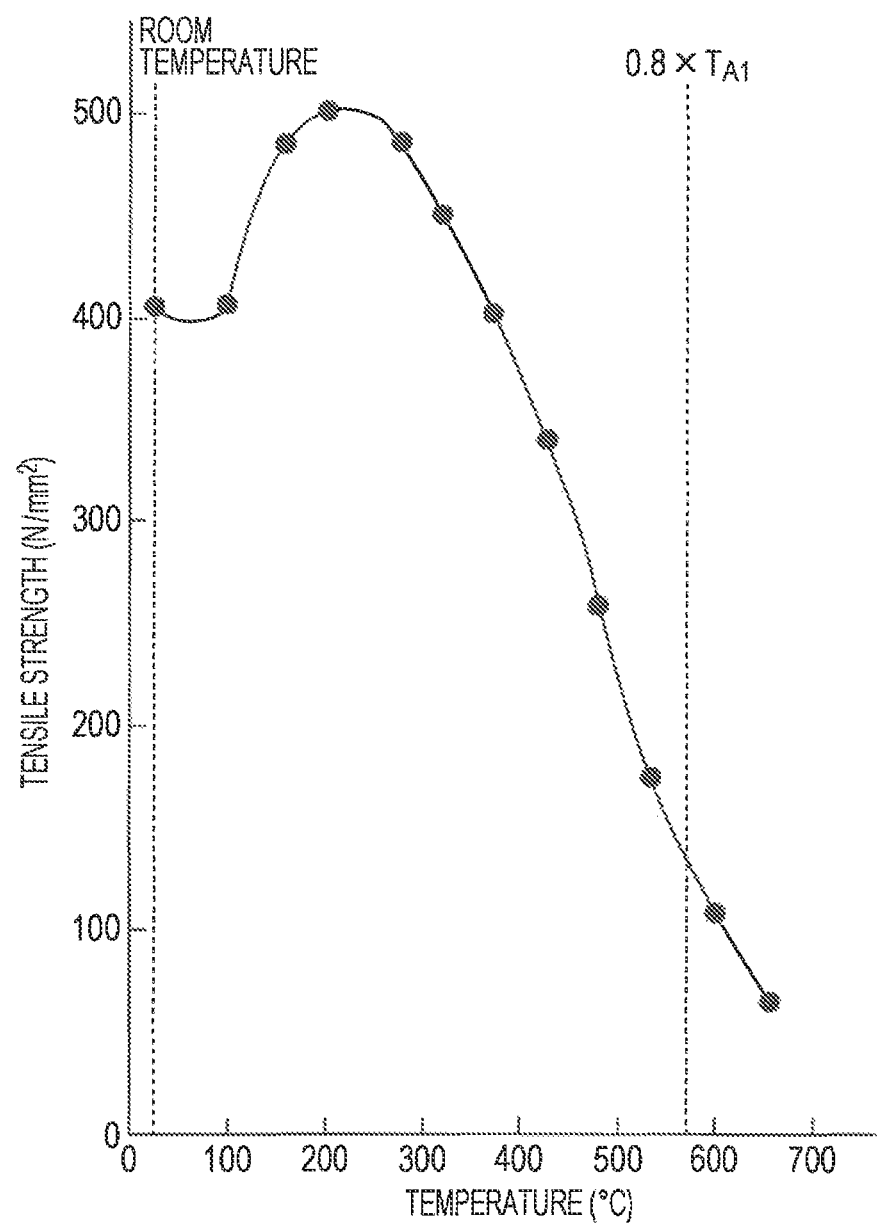
FIG. 3 illustrates the relationship between the temperature and the tensile strength of example structural steel to be used for the friction stir welding apparatus of the present disclosure.

As illustrated in FIG. 3, the steel sheets to be friction-stir welded with the friction stir welding apparatus of the present disclosure normally have a strength of about 30% of room-temperature strength at a temperature of about 80% of $T_{A1}$, which is the transformation temperature of steel. As the temperature is higher than about 80% of $T_{A1}$, the steel sheet has lower strength. For this, the steel sheet is softened in advance by increasing the surface temperature of the steel sheet to $0.8 \times T_{A1}°$ C. or higher, and the softened portion of the steel sheet is stirred to promote plastic flow, which reduces the load on the rotary tool and increases the welding speed. In the present disclosure, the surface temperature $T_s$ (° C.) of the steel sheet in the heated region 12 is set to $0.8 \times T_{A1}°$ C. or higher. The temperature $T_{A1}$ (° C.) can be obtained from Formula (1) below.

$$T_{A1}(° C.)=723-10.7[\% \text{ Mn}]-16.9[\% \text{ Ni}]+29.1[\% \text{ Si}]+16.9[\% \text{ Cr}]+290[\% \text{ As}]+6.38[\% \text{ W}] \quad (1)$$

where [% M] represents an amount (mass %) of element M in the steel sheet used as a workpiece, with [% M] being 0 when the steel sheet is free of element M.

To ensure the heated region in the thickness direction, the surface of the heated region may have a temperature gradient. In this case, the surface temperature of the steel sheet in the heated region is preferably $1.5 \times T_M°$ C. or lower. To avoid damage to the rotary tool and changes in microstructure due to an excessive increase in the temperature of the welded part, the surface temperature of the steel sheet in the heated region is preferably lower than $T_M°$ C. before the heated region contacts the rotary tool passing through the heated region.

The temperature $T_M$ (° C.) is a melting point of the steel sheet used as a workpiece.

[Minimum Distance between Rotary Tool and Heated Region on Surface of Steel Sheet: Equal to or Less Than Diameter of Shoulder of Rotary Tool]

If the distance between the rotary tool and the heated region on the surface of the steel sheet is too large, the temperature of the heated region before welding decreases, which hinders obtaining a sufficient preheating effect. Thus, the minimum distance X between the heated region on the surface of the steel sheet and the rotary tool moving in the welding direction is set to a distance equal to or less than the diameter of the shoulder of the rotary tool.

If the distance between the heated region and the rotary tool is too small, the rotary tool may be damaged by the heat from the heating device. Thus, the minimum distance between the heated region on the surface of the steel sheet and the rotary tool moving in the welding direction is preferably set to 0.1 times or more of the diameter of the shoulder of the rotary tool.

The diameter of the shoulder of the rotary tool is about 8 to 60 mm.

[Area of Heated Region on Surface of Steel Sheet: Equal to or Less than Area of Maximum Diameter Part of Pin of Rotary Tool]

If the heated region 12 is too large, the microstructures of the heated region and the surrounding region change. In particular, in the case of high-tensile steel sheets reinforced by the martensite structure, heating at the ferrite-austenite transformation temperature or lower still tempers martensite to cause softening and thus significantly reduces the weld joint strength. For this, the area of the heated region on the surface of the steel sheet is set to an area equal to or less than the area of the maximum diameter part of the pin of the rotary tool.

Figure 4:
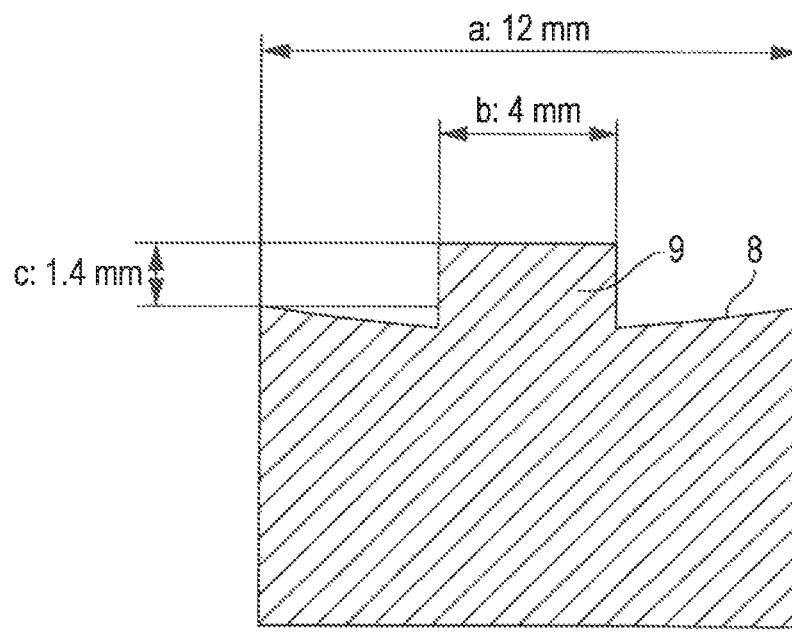
FIG. 4 illustrates the cross-sectional dimensions of a rotary tool used in Examples.

The maximum radius of the pin of the rotary tool corresponds to b in the projection view of the shape of the tool illustrated in FIG. 4. When the pin in the tool with another shape has, for example, a tapered shape such that the pin diameter changes with positions, the maximum radius of the pin corresponds to the radius at the position where the pin has the maximum diameter in the projection view.

If the area of the heated region is too small, a sufficient preheating effect is not obtained. Thus, the area of the heated region on the surface of the steel sheet is preferably 0.1 times or more of the area of the maximum diameter part in the pin of the rotary tool.

The maximum diameter of the pin of the rotary tool is about 2 to 50 mm.

[Area of Heated Region Located Between Welding Centerline and AS Line on Surface of Steel Sheet: 50% or More of Area of Heated Region on Surface of Steel Sheet]

In friction stir welding of steel material, plastic flow starts on the advancing side, moves in the direction of rotation of the rotary tool, passes through the front side in the welding direction, through the retreating side, and through the rear side in the welding direction, and ends on the advancing side. Since the plastic flow starts on the advancing side as described above, the steel sheet used as a workpiece on the advancing side tends to undergo insufficient heating. If defects are generated due to insufficient plastic flow, most of the defects are generated on the advancing side.

When 50% or more of the area of the heated region 12 on the surface of the steel sheet is located between the welding centerline 10 and the AS line 11 parallel to the welding centerline 10, and the surface of the steel sheet on the advancing side is preferentially heated, plastic flow can be promoted to reduce generation of defects and increase the welding speed. The proportion of the area of the heated region 12 located between the welding centerline 10 and the AS line 11 is preferably 60% or more, and more preferably 80% or more. The proportion may be 100%.

The center of the heated region is located between the AS line and the straight line passing through the midpoint between the welding centerline and the AS line in order to preferentially heat the steel sheet on the advancing side. In other words, the center of the heated region is preferably located on the advancing side of the welding centerline, and the distance from the center of the heated region to the welding centerline is preferably from 0.5 times to 1 time the maximum radius of the pin of the rotary tool.

[Temperature $T_D$ of Region in Thickness Direction of Heated Region: $T_D \geq 0.8 \times T_{A1}$]

As described above, the steel sheets to be welded with the friction stir welding apparatus of the present disclosure normally have a strength of about 30% of room-temperature strength at a temperature of about 80% of $T_{A1}$, which is the transformation temperature of steel. As the temperature is higher than about 80% of $T_{A1}$, the steel sheets have lower strength. Preferably, a region of the steel sheet in the thickness direction of the heated region is also softened in advance by increasing the temperature to $0.8 \times T_{A1}°$ C. or higher, and the softened portion of the steel sheet is stirred to promote plastic flow, which further reduces the load on the rotary tool and further increases the welding speed. Therefore, the temperature $T_D$ of the heated region in the thickness direction, which defines the depth D of the heated region described below, is set to $0.8 \times T_{A1}°$ C. or higher. The temperature $T_{A1}$ (° C.) can be obtained from Formula (1) below.

$$T_{A1}(° \text{C.}) = 723 - 10.7[\% \text{ Mn}] - 16.9[\% \text{ Ni}] + 29.1[\% \text{ Si}] + 16.9[\% \text{ Cr}] + 290[\% \text{ As}] + 6.38[\% \text{ W}] \quad (1)$$

where [% M] represents an amount (mass %) of element M in the steel sheet used as a workpiece.

To ensure the heated region in the thickness direction, the heated region may have a temperature gradient in the thickness direction. In this case, the temperature of the steel sheet in the heated region in the thickness direction is preferably $1.5 \times T_M°$ C. or lower. To avoid damage to the rotary tool and changes in microstructure due to an excessive increase in the temperature of the welded part, the temperature of the steel sheet in the heated region in the thickness direction is preferably lower than $T_M°$ C. before the heated region contacts the rotary tool passing through the heated region.

The temperature $T_M$ (° C.) is a melting point of the steel sheet used as a workpiece.

[Depth D of Heated Region: 30% or More of Total Thickness of Steel Sheet]

The depth D of the heated region is defined as the maximum depth of a region that has a temperature $T_D$ of $0.8 \times T_{A1}°$ C. or higher in the heated region in the thickness direction and that extends from the surface of the steel sheet used as a workpiece. In this case, the depth D of the heated region is preferably 30% or more of the total thickness of the steel sheet. This is because plastic flow is further promoted by setting the depth D of this heated region to 30% or more of the total thickness of the steel sheet, which is advantageous in reducing the load on the rotary tool and increasing the welding speed. More preferably, the depth D of the heated region is 50% or more of the total thickness of the steel sheet.

However, if the depth D of the heated region exceeds 90% of the total thickness of the steel sheet, excessive heating may cause changes in microstructure. Thus, the depth D of the heated region is preferably 90% or less of the total thickness of the steel sheet.

The heating device used in the preheating process is not limited to a particular device, but a laser heating device is preferably used.

This is because using a laser with high energy density as a heat source enables accurate control of the conditions of the preheating process and improves welding workability without impairing weld joint properties.

The conditions other than the above-described conditions are not limited and, for example, the moving speed of the heating device used in the preheating process is set to substantially the same as the welding speed. When a laser heating device is used as the heating device, the laser output and the beam diameter are set appropriately according to the welding conditions.

The preheating process in the friction stir welding apparatus of the present disclosure is described above. In the friction stir welding apparatus of the present disclosure, a cooling device is provided behind the rotary tool moving in the welding direction, and the cooling device can improve the weld joint strength.

This is because the welded part is normally cooled naturally after completion of welding, and thus sufficient weld joint strength is not obtained when steel material being workpiece material has low hardenability. Fortunately, the cooling device behind the rotary tool moving in the welding direction can cool the welded part of the steel sheet, and appropriate control of the cooling rate allows the strength to be improved by quench hardening. A specific cooling device is preferably a cooling device using injection of inert gas. The cooling rate in this case is preferably, for example, 30 to 300° C./s from 800 to 500° C.

If steel material being workpiece material has high hardenability, there is a problem in that the welded part may be excessively hardened to reduce the toughness of the weld joint. Fortunately, excessive hardening can be suppressed by placing the rear heating device that heats the rear part close to the rotary tool and appropriately controlling the cooling rate to slowly cool the steel sheets. A specific heating device is preferably a heating device using high-frequency induction heating or using a laser as a heat source. The slow cooling rate in this case is preferably, for example, 10 to 30° C./s from 800 to 500° C.

A rear heating device may be provided behind the rotary tool moving in the welding direction and after the cooling device. The rear heating device may reheat the welded part of the steel sheets.

If the welded part is quench-hardened by cooling with the cooling device and excessively hardened, the hardness can be reduced by tempering the welded part with the rear heating device to obtain good joint properties, namely, both high strength and toughness. The cooling rate in this case is preferably, for example, 30 to 300° C./s from 800 to 500° C. The reheating temperature is preferably, for example, from 550 to 650° C.

A cooling device may be provided behind the rotary tool moving in the welding direction and after the rear heating device. The cooling device may cool the welded part of the steel sheets.

In this case, a composite microstructure can be formed by, just after welding, reducing the cooling rate with the rear heating device and then increasing the cooling rate with the cooling device, which provides good joint properties, namely, both high strength and ductility. For example, the cooling rate in this case is preferably about 10 to 30° C./s from 800 to 600° C. and then 30 to 300° C./s from 600 to 400° C.

The welding conditions other than the above-described conditions are set according to an ordinary method. A larger torque of the rotary tool means lower plastic flowability of the steel sheets and higher tendency to generate defects or the like.

In the present disclosure, attempts are made to regulate the torque of the rotary tool by controlling the rotation speed of the rotary tool in the range of 100 to 1000 rpm and to increase the welding speed to 1000 mm/min or higher.

As the type of steel targeted in the present disclosure, general structural steel or carbon steel, such as rolled steel for weld structure of JIS G 3106 or carbon steel for machine structure of JIS G 4051, can be preferably used. The present disclosure can also be advantageously applied to high-strength structural steel having tensile strength of 800 MPa or higher. In this case, the strength of the welded part is equal to or higher than 85% of the tensile strength of the steel sheet (base material) or equal to or higher than 90% of the tensile strength of the steel sheet (base material).

EXAMPLES

Example 1

Friction stir welding was performed using a steel sheet having a thickness of 1.6 mm and having the chemical composition and the tensile strength shown in Table 1. The joint abutting faces formed a non-angled square groove and were subjected to one-side one-pass welding while the surface conditions were similar to those after milling. The welding conditions for friction stir welding are shown in Table 2. A rotary tool made of tungsten carbide (WC) and having the cross-sectional dimensions shown in FIG. 4 (shoulder diameter a: 12 mm, maximum diameter b of pin: 4.0 mm, probe length c: 1.4 mm) was used. During welding, oxidation of the surface was prevented by shielding the welded part with argon gas.

TABLE 1

| | Chemical Composition (mass %) | | | | | Tensile Strength | $0.8 \times$ |
| --- | --- | --- | --- | --- | --- | --- | --- |
| No. | C | Si | Mn | P | S | (MPa) | $T_{A1}$ (° C.) |
| 1 | 0.3 | 0.21 | 0.69 | 0.012 | 0.003 | 1015 | 577 |
| 2 | 0.16 | 0.07 | 0.69 | 0.016 | 0.009 | 420 | 574 |

TABLE 2

| Inclined Angle (°) of Tool | Rotation Speed (rpm) of Tool | Welding Speed (mm/min) |
| --- | --- | --- |
| 3 | 400 | 400 |

To determine the region heated by preheating using a laser as a heat source before welding, steel sheet 1 shown in Table 1 was irradiated with a laser beam under different irradiation conditions (laser moving speed, laser output, and beam diameter) shown in Table 3, and the surface temperature was measured by thermography. Microstructure observation using a Nital etching solution was carried out by observing the cross section of the laser-irradiated part.

The region having temperatures equal to or higher than the transformation point ($T_{A1}$° C.) was etched in the darkest gray, and its surrounding region where the temperature was lower than the transformation point ($T_{A1}$° C.) but the structure with high hardness such as martensite in the base material was tempered was etched relatively in light gray. The region having temperatures equal to or higher than the transformation point ($T_{A1}$° C.), the region tempered at temperatures lower than the transformation point ($T_{A1}$° C.), and the base-material region can be distinguished from each other. On the basis of the knowledge about steel heat treatment, it is known that the region tempered at temperatures lower than the transformation point ($T_{A1}°$ C.) corresponds to the region having temperatures of $0.8 \times T_{A1}°$ C. or higher and lower than $T_{A1}°$ C. The depth $D_0$ of the region having temperatures equal to or higher than the transformation point ($T_{A1}°$ C.) and the depth of the region having temperatures equal to or higher than $0.8 \times T_{A1}°$ C. (the depth D of the heated region) were determined by such microstructure observation using a Nital etching solution.

The measurement results are shown in Table 4.

TABLE 3

| Irradiation Conditions | Moving Speed (mm/min) | Laser Output (kW) | Beam Diameter (mm) |
|---|---|---|---|
| A | 400 | 1.4 | 3.0 |
| B | 400 | 1.4 | 1.8 |
| C | 400 | 0.7 | 4.0 |

TABLE 4

| Irradiation Conditions | Shape of Heated Region | Diameter (mm) of Heated Region on Surface of Steel Sheet | $D_0$ (mm) | Depth D (mm) of Heated Region |
|---|---|---|---|---|
| A | circle | 3.5 | 0.28 | 0.30 |
| B | circle | 2.0 | 0.47 | 0.50 |
| C | circle | 4.5 | 0.09 | 0.10 |

As shown in Table 4, the measurement results of the surface temperature by thermography indicate that, under the irradiation conditions A, the region having temperatures equal to or higher than $0.8 \times T_{A1}°$ C. had a circular shape with a diameter of 3.5 mm. Since the maximum diameter of the pin of the rotary tool used here is 4.0 mm, the area of the heated region on the surface of the steel sheet is equal to or less than the area of the maximum diameter part of the pin of the rotary tool.

Under the irradiation conditions B, the region having temperatures equal to or higher than $0.8 \times T_{A1}°$ C. had a circular shape with a diameter of 2.0 mm. Therefore, the area of the heated region on the surface of the steel sheet is equal to or less than the area of the maximum diameter part of the pin of the rotary tool similarly as described above.

Under the irradiation conditions C, the region having temperatures equal to or higher than $0.8 \times T_{A1}°$ C. had a circular shape with a diameter of 4.5 mm. Since the maximum diameter of the pin of the rotary tool used here is 4.0 mm, the area of the heated region on the surface of the steel sheet is larger than the area of the maximum diameter part of the pin of the rotary tool.

As shown in Table 4, observation of the cross section of the laser-irradiated part indicates that, under the irradiation conditions A, the depth $D_0$ of the region having temperatures equal to or higher than $T_{A1}°$ C. and the depth of the region having temperatures equal to or higher than $0.8 \times T_{A1}°$ C. (the depth D of the heated region) were 0.28 mm and 0.30 mm, respectively. Since the thickness t of the steel sheet used as a workpiece is 1.6 mm, the depth D of the heated region, which is the depth of the region having temperatures equal to or higher than $0.8 \times T_{A1}°$ C., is about 18.8% of the thickness t of the steel sheet.

Under the irradiation conditions B, the depth $D_0$ of the region having temperatures equal to or higher than $T_{A1}°$ C. and the depth of the region having temperatures equal to or higher than $0.8 \times T_{A1}°$ C. (the depth D of the heated region) were 0.47 mm and 0.50 mm, respectively. Since the thickness t of the steel sheet used as a workpiece is 1.6 mm, the depth D of the heated region is about 31.3% of the thickness t of the steel sheet.

Under the irradiation conditions C, the depth $D_0$ of the region having temperatures equal to or higher than $T_{A1}°$ C. and the depth of the region having temperatures equal to or higher than $0.8 \times T_{A1}°$ C. (the depth D of the heated region) were 0.09 mm and 0.10 mm, respectively. Since the thickness t of the steel sheet used as a workpiece is 1.6 mm, the depth D of the heated region is about 6.3% of the thickness t of the steel sheet.

Table 5 shows the conditions of the preheating process by laser irradiation before welding of the workpieces and the conditions of the process performed after welding. In the process performed after welding, cooling was performed by gas injection and heating (and reheating) was performed by induction heating.

The sign "-" in the conditions of the preheating process and the conditions of the process after welding in Table 5 indicates that the preheating process or the process after welding such as cooling and/or heating was not carried out. The characters "(AS)" or "(RS)" regarding the distance from the welding centerline to the center of the heated region indicate whether the center of the heated region is located on the advancing side of the welding centerline or on the retreating side of the welding centerline.

TABLE 5

| | Sample Steel Sheet | Laser Irradiation Conditions | Conditions of Preheating Process | | | | Conditions of Process after Welding | | |
|---|---|---|---|---|---|---|---|---|---|
| | | | Minimum Distance X (mm) between Heated Region and Rotary Tool | Distance (mm) from Welding Centerline to Center of Heated Region | Proportion (%) of Area of Heated Region Located between Welding Centerline and AS Line | | Additional Process | Cooling (Slow Cooling) Rate (° C./s) | Reheating Temperature (° C.) |
| Example 1 | 1 | A | 1 | 1.0 (AS) | 50 or more | 70 | — | — | — |
| Example 2 | 1 | B | 1 | 0.5 (AS) | 50 or more | 80 | — | — | — |
| Example 3 | 1 | B | 1 | 1.0 (AS) | 50 or more | 100 | — | — | — |
| Example 4 | 1 | B | 1 | 1.8 (AS) | 50 or more | 63 | — | — | — |
| Example 5 | 1 | B | 3 | 1.8 (AS) | 50 or more | 63 | — | — | — |
| Example 6 | 1 | B | 1 | 1.8 (AS) | 50 or more | 63 | cooling → reheating | 250*[1] | 600 |
| Example 7 | 1 | B | 3 | 1.8 (AS) | 50 or more | 63 | cooling → reheating | 250*[1] | 600 |
| Example 8 | 2 | B | 3 | 1.8 (AS) | 50 or more | 63 | cooling only | 100*[1] | — |
| Example 9 | 1 | B | 3 | 1.8 (AS) | 50 or more | 63 | heating only | 10*[1] | — |

TABLE 5-continued

| | | Conditions of Preheating Process | | | | Conditions of Process after Welding | | |
|---|---|---|---|---|---|---|---|---|
| Sample Steel Sheet | Laser Irradiation Conditions | Minimum Distance X (mm) between Heated Region and Rotary Tool | Distance (mm) from Welding Centerline to Center of Heated Region | Proportion (%) of Area of Heated Region Located between Welding Centerline and AS Line | | Additional Process | Cooling (Slow Cooling) Rate (° C./s) | Reheating Temperature (° C.) |
| Example 10 | 1 | B | 3 | 1.8 (AS) | 50 or more | 63 | heating → cooling | 10*² → 100*³ | — |
| Comparative Example 1 | 1 | — | — | — | — | — | — | — | — |
| Comparative Example 2 | 1 | B | 13 | 1.8 (AS) | 50 or more | 63 | — | — | — |
| Comparative Example 3 | 1 | B | 1 | 2.3 (AS) | less than 50 | 31 | — | — | — |
| Comparative Example 4 | 1 | B | 1 | 1.8 (AS) | less than 50 | 0 | — | — | — |
| Comparative Example 5 | 1 | C | 1 | 2.3 (AS) | less than 50 | 42 | — | — | — |

*¹cooling rate from 800 ° C. to 500 ° C.
*²cooling rate from 800 ° C. to 600 ° C.
*³cooling rate from 600 ° C. to 400 ° C.

Table 6 shows the measurements of the torque of the rotary tool during welding and the tensile strength obtained by performing tensile testing on tensile test specimens that were taken from the obtained weld joint with the size of No. 1 specimen defined in JIS Z 3121.

A larger torque of the rotary tool means lower plastic flowability and higher tendency to generate defects or the like.

TABLE 6

| | Torque (N · m) of Rotary Tool | Tensile Strength (MPa) |
|---|---|---|
| Example 1 | 75 | 918 |
| Example 2 | 68 | 920 |
| Example 3 | 60 | 916 |
| Example 4 | 53 | 931 |
| Example 5 | 72 | 911 |
| Example 6 | 52 | 1010 |
| Example 7 | 71 | 1012 |
| Example 8 | 70 | 418 |
| Example 9 | 72 | 950 |
| Example 10 | 71 | 975 |
| Comparative Example 1 | 90 | 919 |
| Comparative Example 2 | 88 | 914 |
| Comparative Example 3 | 82 | 905 |
| Comparative Example 4 | 87 | 918 |
| Comparative Example 5 | 85 | 921 |

Table 6 shows that, in Examples 1 to 10, a high welding speed still resulted in a strength corresponding to 85% or higher of the tensile strength of the steel sheet used as a base material as well as a torque of the rotary tool of 75 N·m or less, which indicates good plastic flowability. In particular, Examples 6 and 7 involving cooling and reheating after welding exhibited a strength corresponding to 99% or higher of the tensile strength of the base material.

In Comparative Examples 1 to 5, the torque of the rotary tool was 80 N·m or higher, which indicates poor plastic flowability.

Example 2

As in Example 1, friction stir welding was performed using a steel sheet having a thickness of 1.6 mm and having the chemical composition and the tensile strength shown in Table 1. The joint abutting faces formed a non-angled square groove and were subjected to one-side one-pass welding while the surface conditions were similar to those after milling. The welding conditions for friction stir welding are shown in Table 7. As in Example 1, a rotary tool made of tungsten carbide (WC) and having the cross-sectional dimensions shown in FIG. 4 (shoulder diameter a: 12 mm, maximum diameter b of pin: 4.0 mm, probe length c: 1.4 mm) was used. During welding, oxidation of the surface was prevented by shielding the welded part with argon gas.

TABLE 7

| Inclined Angle (°) of Tool | Rotation Speed (rpm) of Tool | Welding Speed (mm/min) |
|---|---|---|
| 3 | 600 | 1000 |

To determine the region heated by preheating using a laser as a heat source before welding, steel sheet 1 shown in Table 1 was irradiated with a laser beam under different irradiation conditions (laser moving speed, laser output, and beam diameter) shown in Table 8, and the surface temperature was measured by thermography. Moreover, microstructure observation using a Nital etching solution was carried out by observing the cross section of the laser-irradiated part as in Example 1 to determine the depth $D_0$ of the region having temperatures equal to or higher than the transformation point ($T_{A1}$° C.) and the depth of the region having temperatures equal to or higher than $0.8 \times T_{A1}$° C. (the depth D of the heated region).

The measurement results are shown in Table 9.

TABLE 8

| Irradiation Conditions | Moving Speed (mm/min) | Laser Output (kW) | Beam Diameter (mm) |
|---|---|---|---|
| D | 1000 | 3.5 | 3.0 |
| E | 1000 | 3.5 | 1.8 |
| F | 1000 | 1.8 | 4.0 |

TABLE 9

| Irradiation Conditions | Shape of Heated Region | Major Axis (mm) of Heated Region on Surface of Steel Sheet | Minor Axis (mm) of Heated Region on Surface of Steel Sheet | $D_0$ (mm) | Depth D (mm) of Heated Region |
|---|---|---|---|---|---|
| D | ellipse | 3.8 | 3.2 | 0.30 | 0.32 |
| E | ellipse | 2.2 | 1.8 | 0.51 | 0.54 |
| F | ellipse | 4.9 | 4.1 | 0.10 | 0.11 |

As shown in Table 9, the measurement results of the surface temperature by thermography indicate that, under the irradiation conditions D, the region having temperatures equal to or higher than $0.8 \times T_{A1}°$ C. had an elliptical shape with a major axis in the laser moving direction and a minor axis in the direction perpendicular to the laser moving direction, specifically, with a major axis of 3.8 mm and a minor axis of 3.2 mm. Since the maximum diameter of the pin of the rotary tool used here is 4.0 mm, the area of the heated region on the surface of the steel sheet is equal to or less than the area of the maximum diameter part of the pin of the rotary tool.

Under the irradiation conditions E, the region having temperatures equal to or higher than $0.8 \times T_{A1}°$ C. had an elliptical shape with a major axis in the laser moving direction and a minor axis in the direction perpendicular to the laser moving direction, specifically, with a major axis of 2.2 mm and a minor axis of 1.8 mm. Therefore, the area of the heated region on the surface of the steel sheet is equal to or less than the area of the maximum diameter part of the pin of the rotary tool similarly as described above.

Under the irradiation conditions F, the region having temperatures equal to or higher than $0.8 \times T_{A1}°$ C. had an elliptical shape with a major axis in the laser moving direction and a minor axis in the direction perpendicular to the laser moving direction, specifically, with a major axis of 4.9 mm and a minor axis of 4.1 mm. Since the maximum diameter of the pin of the rotary tool used here is 4.0 mm, the area of the heated region on the surface of the steel sheet is larger than the area of the maximum diameter part of the pin of the rotary tool.

As shown in Table 9, observation of the cross section of the laser-irradiated part indicates that, under the irradiation conditions D, the depth $D_0$ of the region having temperatures equal to or higher than $T_{A1}°$ C. and the depth of the region having temperatures equal to or higher than $0.8 \times T_{A1}°$ C. (the depth D of the heated region) were 0.30 mm and 0.32 mm, respectively. Since the thickness t of the steel sheet used as a workpiece is 1.6 mm, the depth D of the heated region, which is the depth of the region having temperatures equal to or higher than $0.8 \times T_{A1}°$ C., is about 20.0% of the thickness t of the steel sheet.

Under the irradiation conditions E, the depth $D_0$ of the region having temperatures equal to or higher than $T_{A1}°$ C. and the depth of the region having temperatures equal to or higher than $0.8 \times T_{A1}°$ C. (the depth D of the heated region) were 0.51 mm and 0.54 mm, respectively. Since the thickness t of the steel sheet used as a workpiece is 1.6 mm, the depth D of the heated region is about 33.8% of the thickness t of the steel sheet.

Under the irradiation conditions F, the depth $D_0$ of the region having temperatures equal to or higher than $T_{A1}°$ C. and the depth of the region having temperatures equal to or higher than $0.8 \times T_{A1}°$ C. (the depth D of the heated region) were 0.10 mm and 0.11 mm, respectively. Since the thickness t of the steel sheet used as a workpiece is 1.6 mm, the depth D of the heated region is about 6.9% of the thickness t of the steel sheet.

Table 10 shows that the conditions of the preheating process by laser irradiation before welding of the workpieces and the conditions of the process performed after welding. In the process performed after welding, cooling was performed by gas injection and heating (and reheating) was performed by induction heating.

The sign "-" in the conditions of the preheating process and the conditions of the process after welding in Table 10 indicates that the preheating process or the process after welding such as cooling and/or heating was not carried out. The characters "(AS)" or "(RS)" regarding the distance from the welding centerline to the center of the heated region indicate whether the center of the heated region is located on the advancing side of the welding centerline or on the retreating side of the welding centerline.

TABLE 10

| | | | Conditions of Preheating Process | | | Conditions of Process after Welding | | |
|---|---|---|---|---|---|---|---|---|
| | Sample Steel Sheet | Laser Irradiation Conditions | Minimum Distance X (mm) between Heated Region and Rotary Tool | Distance (mm) from Welding Centerline to Center of Heated Region | Proportion (%) of Area of Heated Region Located between Welding Centerline and AS Line | Additional Process | Cooling (Slow Cooling) Rate (° C./s) | Reheating Temperature (° C.) |
| Example 11 | 1 | D | 1 | 1.0 (AS) | 50 or more | 75 | — | — | — |
| Example 12 | 1 | E | 1 | 0.5 (AS) | 50 or more | 85 | — | — | — |
| Example 13 | 1 | E | 1 | 1.0 (AS) | 50 or more | 100 | — | — | — |
| Example 14 | 1 | E | 1 | 1.8 (AS) | 50 or more | 65 | — | — | — |
| Example 15 | 1 | E | 3 | 1.8 (AS) | 50 or more | 65 | — | — | — |
| Example 16 | 1 | E | 1 | 1.8 (AS) | 50 or more | 65 | cooling → reheating | 300*1 | 600 |
| Example 17 | 1 | E | 3 | 1.8 (AS) | 50 or more | 65 | cooling → reheating | 300*1 | 600 |
| Example 18 | 2 | E | 3 | 1.8 (AS) | 50 or more | 65 | cooling only | 150*1 | — |
| Example 19 | 1 | E | 3 | 1.8 (AS) | 50 or more | 65 | heating only | 30*1 | — |
| Example 20 | 1 | E | 3 | 1.8 (AS) | 50 or more | 65 | heating → cooling | 30*2 → 150*3 | — |
| Comparative Example 6 | 1 | — | — | — | — | — | — | — |
| Comparative | 1 | E | 13 | 1.8 (AS) | 50 or more | 65 | | | |

TABLE 10-continued

| | Sample Steel Sheet | Laser Irradiation Conditions | Conditions of Preheating Process | | | Conditions of Process after Welding | | |
|---|---|---|---|---|---|---|---|---|
| | | | Minimum Distance X (mm) between Heated Region and Rotary Tool | Distance (mm) from Welding Centerline to Center of Heated Region | Proportion (%) of Area of Heated Region Located between Welding Centerline and AS Line | Additional Process | Cooling (Slow Cooling) Rate (° C./s) | Reheating Temperature (° C.) |
| Example 7 Comparative Example 8 | 1 | E | 1 | 2.3 (AS) | less than 50 | 28 | — | — | — |
| Comparative Example 9 | 1 | E | 1 | 1.8 (AS) | less than 50 | 0 | — | — | — |
| Comparative Example 10 | 1 | F | 1 | 2.3 (AS) | less than 50 | 41 | — | — | — |

*[1]cooling rate from 800 ° C. to 500 ° C.
*[2]cooling rate from 800 ° C. to 600 ° C.
*[3]cooling rate from 600 ° C. to 400 ° C.

Table 11 shows the measurements of the torque of the rotary tool during welding and the tensile strength obtained by performing tensile testing on tensile test specimens that were taken from the obtained weld joint with the size of No. 1 specimen defined in JIS Z 3121.

A larger torque of the rotary tool means lower plastic flowability and higher tendency to generate defects or the like.

TABLE 11

| | Torque (N·m) of Rotary Tool | Tensile Strength (MPa) |
|---|---|---|
| Example 11 | 95 | 940 |
| Example 12 | 94 | 952 |
| Example 13 | 87 | 934 |
| Example 14 | 85 | 946 |
| Example 15 | 95 | 933 |
| Example 16 | 87 | 1015 |
| Example 17 | 96 | 1014 |
| Example 18 | 91 | 418 |
| Example 19 | 95 | 971 |
| Example 20 | 95 | 990 |
| Comparative Example 6 | — | — |
| Comparative Example 7 | — | — |
| Comparative Example 8 | — | — |
| Comparative Example 9 | — | — |
| Comparative Example 10 | — | — |

Table 11 shows that, in Examples 11 to 20, a high welding speed of 1000 mm/min still allowed welding at a torque of the rotary tool of 100 N·m or lower and resulted in a strength corresponding to 85% or higher of the tensile strength of the steel sheet used as a base material, which provided a satisfactory joint. In particular, Examples 16 and 17 involving cooling and reheating after welding exhibited a strength of 99% or higher of the tensile strength of the base material.

In Comparative Example 6, welding was failed because the rotary tool was damaged during welding. In Comparative Examples 7 to 10, welding was failed because the non-welded part remained, so that a satisfactory joint was not obtained. Therefore, the torque of the rotary tool and the like were not measured in Comparative Examples 6 to 10.

REFERENCE SIGNS LIST

1 Rotary Tool
2 Rotation Axis
3 Steel Sheet
4 Welded Part
5 Heating Device
6 Cooling Device
7 Rear Heating Device
8 Shoulder of Rotary Tool
9 Pin of Rotary Tool
10 Welding Centerline
11 AS Line
12 Heated Region
13 Cooled Region
14 Reheated Region
a Diameter of Shoulder of Rotary Tool
b Maximum Diameter of Pin of Rotary Tool
c Probe Length of Rotary Tool
X Minimum Distance between Heated Region and Rotary Tool
D Depth of Heated Region
t Thickness of Steel Sheet
α Inclined Angle of Rotary Tool

The invention claimed is:

1. A friction stir welding apparatus for structural steel, the welding apparatus comprising:
  a rotary tool that includes a shoulder and a pin disposed on the shoulder,
    the pin sharing a rotation axis with the shoulder,
    at least the shoulder and the pin being made of a material that is harder than steel sheets that are used as workpieces,
  a front heating device that is provided in front of the rotary tool and positioned higher than a top surface of the rotary tool, and
  a rear heating device provided behind the rotary tool and positioned lower than the front heating device,
  wherein:
  the front heating device is adapted to:
    form a heated region
      on the steel sheets such that: (a) a center of the heated region is located on the advancing side; and (b) a distance from the center of the heated region to the welding centerline is from 0.5 times to 1 time a maximum radius of the pin of the rotary tool,
    the heated region having a temperature $T_S$ (° C.) that satisfies $T_S \geq 0.8 \times T_{A1}$ (such that $T_{A1}$ is described in Formula (1) below)

$$T_{A1}(° C.) = 723 - 10.7[\% Mn] - 16.9[\% Ni] + 29.1[\% Si] + 16.9[\% Cr] + 290[\% As] + 6.38[\% W] \quad \text{Formula (1)},$$

where [% M] represents an amount (mass %) of element M in the steel sheets used as a workpiece, the rotary tool is adapted to penetrate into a non-welded part of the steel sheets and to move in a welding direction while the rotary tool rotates so that a portion of the steel sheets which has been preheated by the front heating device is: (i) softened by frictional heat between the rotary tool and the steel sheets and (ii) the softened portion of the steels sheet is stirred with the rotary tool to produce plastic flow, and the welding centerline is a straight line that passes through the rotation axis of the rotary tool and is parallel to the welding direction.

2. The friction stir welding apparatus for structural steel according to claim 1, wherein, where a maximum depth of a region that extends from the surface of the steel sheets in the heated region, in a thickness direction, and has a temperature $T_D$ (° C.) satisfying $T_D \geq 0.8 \times T_{A1}$ (such that $T_{A1}$ is described in the Formula (1)) is defined as a depth D of the heated region, the depth D of the heated region being equal to or larger than 30% of a total thickness t of the steel sheets.

3. The friction stir welding apparatus for structural steel according to claim 1, wherein the front heating device is a laser heating device.

4. The friction stir welding apparatus for structural steel according to claim 1, wherein the rear heating device is adapted to heat a welded part of the steel sheets.

5. The friction stir welding apparatus for structural steel according to claim 4, further comprising a cooling device that is provided behind the rotary tool and the rear heating device and that is adapted to cool the welded part of the steel sheets.

6. The friction stir welding apparatus for structural steel according to claim 1, further comprising a cooling device that is provided behind the rotary tool and that is adapted to cool a welded part of the steel sheets.

7. The friction stir welding apparatus for structural steel according to claim 6, wherein the rear heating device is provided behind the cooling device and is adapted to reheat the welded part of the steel sheets.

8. The friction stir welding apparatus for structural steel according to claim 2, wherein the front heating device is a laser heating device.

9. The friction stir welding apparatus for structural steel according to claim 2, wherein the rear heating device is adapted to heat a welded part of the steel sheets.

10. The friction stir welding apparatus for structural steel according to claim 3, wherein the rear heating device is adapted to heat a welded part of the steel sheets.

11. The friction stir welding apparatus for structural steel according to claim 8, wherein the rear heating device is adapted to heat a welded part of the steel sheets.

12. The friction stir welding apparatus for structural steel according to claim 9, further comprising a cooling device that is provided behind the rotary tool and the rear heating device and that is adapted to cool the welded part of the steel sheets.

13. The friction stir welding apparatus for structural steel according to claim 10, further comprising a cooling device that is provided behind the rotary tool and the rear heating device and that is adapted to cool the welded part of the steel sheets.

14. The friction stir welding apparatus for structural steel according to claim 11, further comprising a cooling device that is provided behind the rotary tool and the rear heating device and that is adapted to cool the welded part of the steel sheets.

15. The friction stir welding apparatus for structural steel according to claim 2, further comprising a cooling device that is provided behind the rotary tool and that is adapted to cool a welded part of the steel sheets.

16. The friction stir welding apparatus for structural steel according to claim 3, further comprising a cooling device that is provided behind the rotary tool and that is adapted to cool a welded part of the steel sheets.

17. The friction stir welding apparatus for structural steel according to claim 15, wherein the rear heating device is adapted to reheat the welded part of the steel sheets.

18. The friction stir welding apparatus for structural steel according to claim 16, wherein the rear heating device is adapted to reheat the welded part of the steel sheets.

19. The friction stir welding apparatus for structural steel according to claim 8, further comprising a cooling device that is provided behind the rotary tool and that is adapted to cool a welded part of the steel sheets.

20. The friction stir welding apparatus for structural steel according to claim 19, wherein the rear heating device is adapted to reheat the welded part of the steel sheets.

* * * * *